March 24, 1970 C. CHEFTEL 3,502,330
REBOUND DEVICE FOR PHYSICAL EXERCISES AND GAMES
HAVING A DEFORMABLE FRAME
Filed Jan. 16, 1967 7 Sheets-Sheet 1

INVENTOR
CYRILLE CHEFTEL

BY Wenderoth, Lind & Ponack
ATTORNEYS

March 24, 1970 C. CHEFTEL 3,502,330
REBOUND DEVICE FOR PHYSICAL EXERCISES AND GAMES
HAVING A DEFORMABLE FRAME
Filed Jan. 16, 1967 7 Sheets-Sheet 2

INVENTOR
CYRILLE CHEFTEL

BY *Wenderoth, Lind & Ponack*

ATTORNEYS

March 24, 1970  C. CHEFTEL  3,502,330
REBOUND DEVICE FOR PHYSICAL EXERCISES AND GAMES
HAVING A DEFORMABLE FRAME
Filed Jan. 16, 1967  7 Sheets-Sheet 3

INVENTOR
CYRILE CHEFTEL

BY Wenderoth, Lind & Ponack
ATTORNEYS

INVENTOR
CYRILE CHEFTEL

INVENTOR
CYRILE CHEFTEL

March 24, 1970　　　　C. CHEFTEL　　　3,502,330
REBOUND DEVICE FOR PHYSICAL EXERCISES AND GAMES
HAVING A DEFORMABLE FRAME
Filed Jan. 16, 1967　　　　　　　　　　7 Sheets-Sheet 7

INVENTOR
CYRILE CHEFTEL

BY Wenderoth, Lind & Ponack
ATTORNEYS

United States Patent Office 3,502,330
Patented Mar. 24, 1970

3,502,330
REBOUND DEVICE FOR PHYSICAL EXERCISES
AND GAMES HAVING A DEFORMABLE FRAME
Cyrille Cheftel, 1 Ave. Marechal-Joffre,
Meudon, Seine-et-Oise, France
Continuation-in-part of application Ser. No. 289,845,
June 24, 1963. This application Jan. 16, 1967, Ser.
No. 609,661
Claims priority, application France, June 22, 1962,
901,559; Feb. 27, 1963, 926,132
Int. Cl. A63b 67/00
U.S. Cl. 273—1
31 Claims

ABSTRACT OF THE DISCLOSURE

The rebound device involves a frame with a plurality of sides fixedly assembled at their ends and having each a swivelable connection about its own longitudinal axis so that each side is swivelably connected to an opposite side by means of the swivelable connections of the adjacent sides to obtain a unit deformable by warping by rotating simultaneously and in contrary directions two pairs of opposite sides around an intermediate axis of the frame. Elastic means are stretched across the sides of the frame and supporting means for said frame are attached thereto for engagement with a supporting surface. The warping permits easier mounting upon a support without sacrificing the requisite rigidity and firmness required in the device.

---

This application is a continuation-in-part of my application Ser. No. 289,845 filed June 24, 1963 and now abandoned, entitled "Rebound Device for Physical Exercises and Games."

This invention relates to an apparatus for physical exercises and games including substantially a rebound surface, such as a net mounted across a frame by means of elastic ropes, arranged to return any object, e.g. a ball, thrown at it by the user of the apparatus. The apparatus of the invention is suitable for the practice of various sports and games involving the use of balls of any size and nature, and also for practicing acrobatic exercises such as somersaults and the like wherein it is the body of the user himself that is thrown against the bounces off the rebound surface.

Rebound devices of the general character described herein have been proposed before. Experience has shown however that none of the rebound devices heretofore available for use purpose is entirely satisfactory and all possess certain deficiencies which it is the general object of the present invention to eliminate or reduce.

One defect common to most or all usual rebound devices is a certain lack of stability, especially when the device is supported against a vertical wall-surface, as would be frequently desirable. It was found that conventional rebound devices are defective as not perfectly abutting against their supporting surface, and such devices are then unable to send back the object hurled against them, without vibrations or jolts, thereby detracting from the efficient return of the object by the rebound surface.

An object of the invention includes the provision of a rebound device adapted to be applied with complete stability, by changes in its geometrical configuration against any supporting surface, thereby ensuring fully effective and silent rebound under all circumstances, together with improved performance over prolonged periods of use.

Another object is to suspend such a device from a vertical surface such as a wall surface providing means for easily altering the vertical position and angular setting of the device.

A further object is to provide means for using the rebound device from a horizontal ground surface in a horizontal or inclined position.

Still another object is to provide the rebound device with reinforcing moving means opposing maximum resistance to the forces generated by the impact of the object hurled against it.

A further object of the invention is to provide somewhat standardized forms wherein frames of different configuration may be easily and quickly formed.

With the above and other objects in view which will appear from the detailed description below, various embodiments of the invention are shown in the drawings in which.

Figure 2:
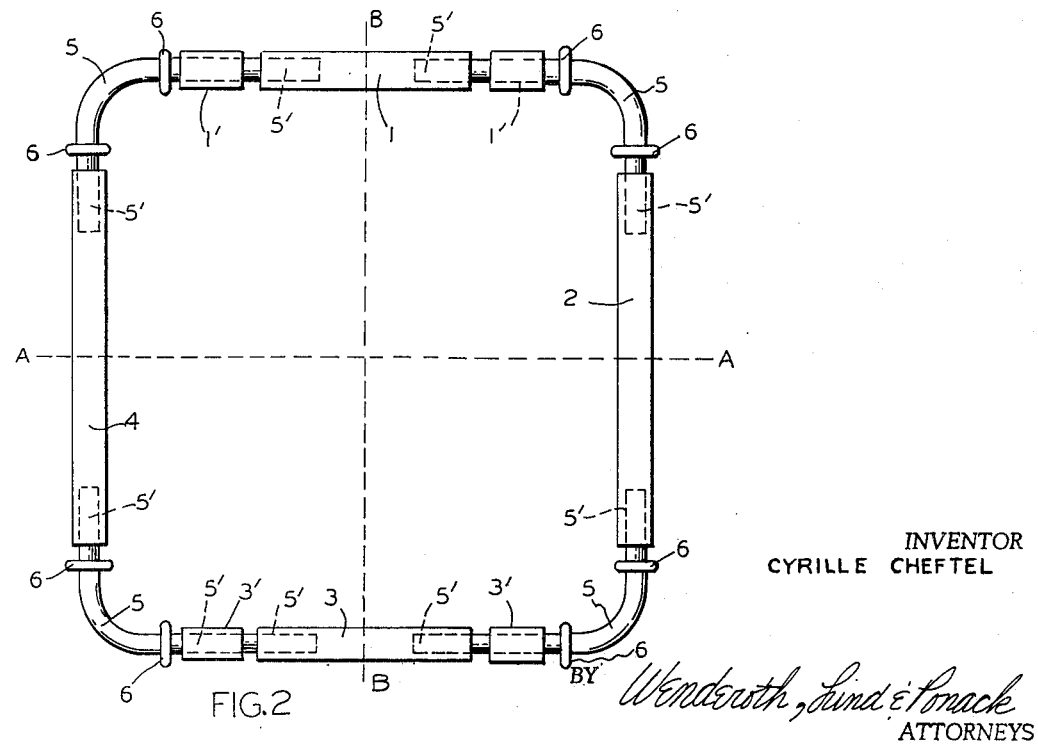
FIG. 2 is a front or plan view of the frame of the device.
Figure 23:
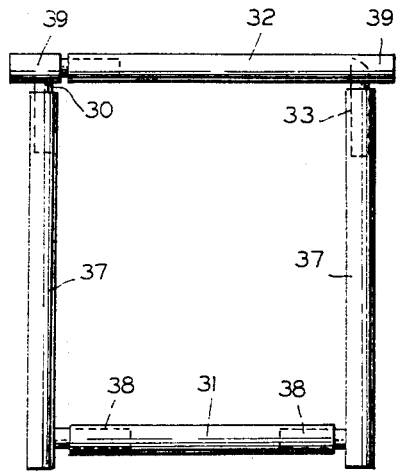
Figure 25:
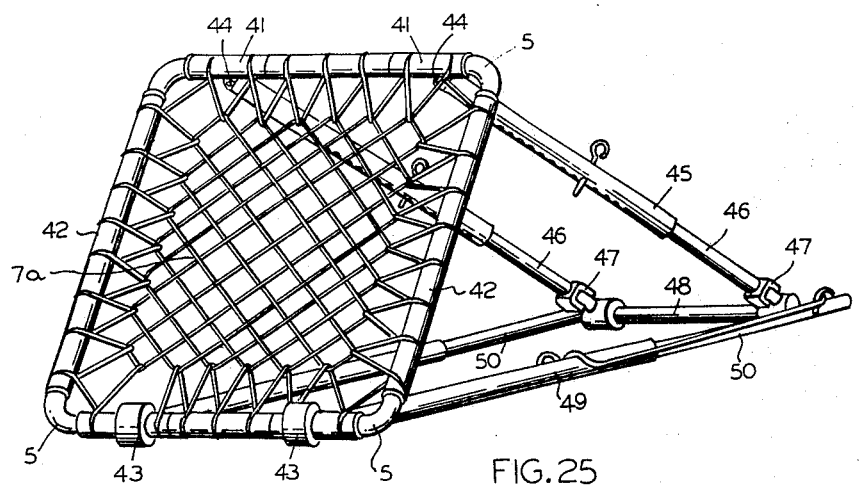
Figure 24:
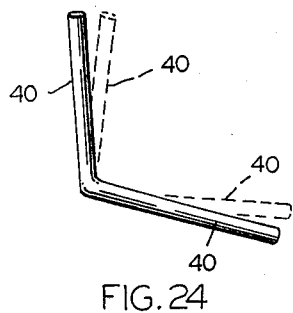
Figure 26:
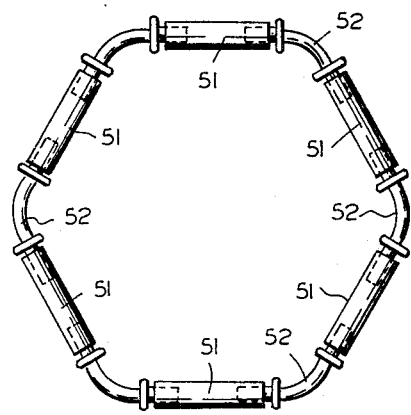
Figure 27:
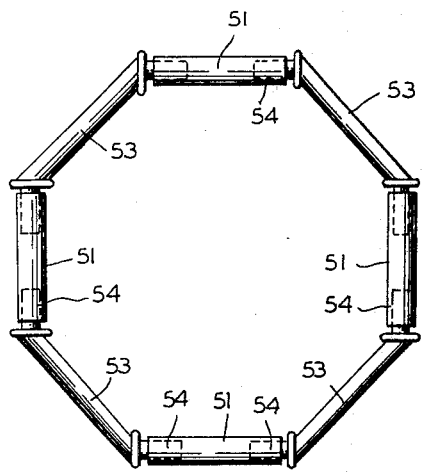

FIGURES 12 to 22 inclusive illustrate plan views of the various types of frames which may be constructed from the elements shown in FIGURES 8 to 11 inclusive;

FIGURE 23 is a plan view of a modified form of frame wherein integral projections are provided upon certain side members;

FIG. 24 is a plan view of a further corner member illustrating the use of the resiliency inherent in the material forming the corner member;

FIG. 25 is a perspective view of a further modification of the rebound device illustrating particularly the means for mounting the frame and net upon supporting means;

FIG. 26 is a plan view of a modified frame wherein a hexagonal frame is constructed from a plurality of similar elements and FIGURE 27 is a front or plan view of a frame similar to the frame of FIGURE 2 but having modified corner members.

In the various views similar reference characters have been used to designate similar parts throughout the figures.

Figure 1:
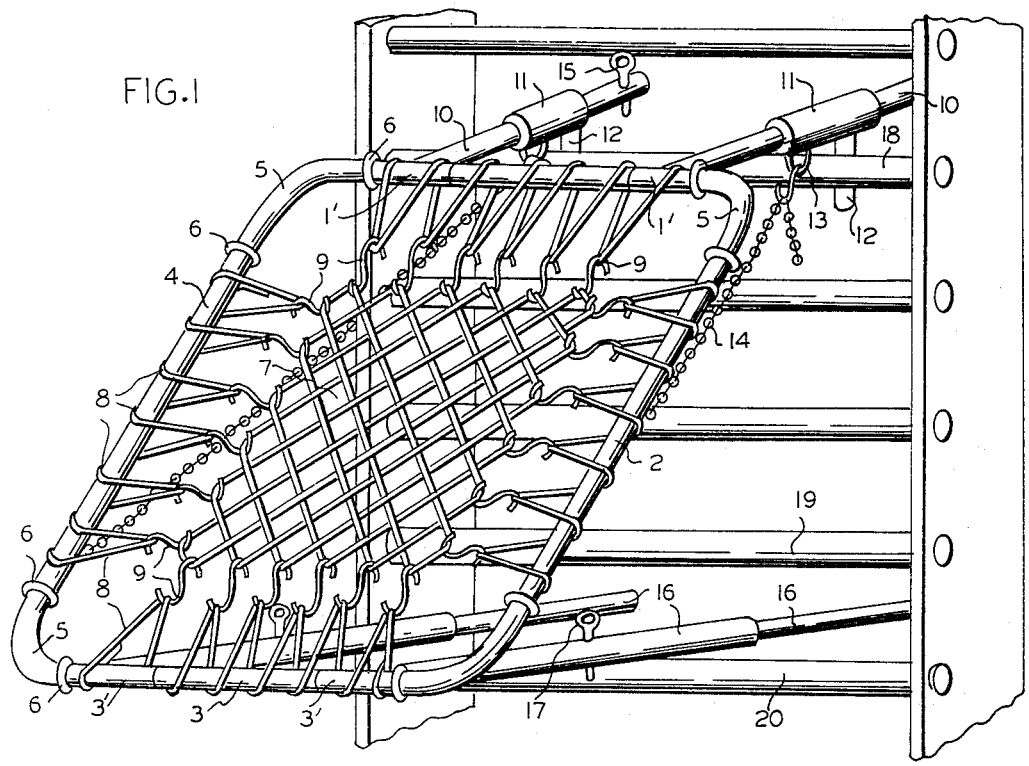
FIG. 1 is a perspective view of one form of an improved rebound device suspended from a wall-bar apparatus.
Figure 3:
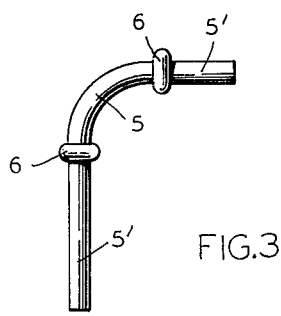
FIG. 3 illustrates a connecting corner part of the frame.

Referring to FIGS. 1 and 2, the improved rebound device shown comprises a four-sided square frame assembled from tubular metallic members 1, 2, 3 and 4 and interconnecting corner parts, such as curved arc shaped connecting parts 5. A corner part 5 is shown in FIG. 3 having straight extensions 5' separated from its curved intermediate part by annular stop pieces 6. The said extensions 5' are adapted to fit snugly but easily into the ends of the apertures of the tubular members 1, 2, 3 and 4. It will be noted in respect to the member 1, and 3, which in FIG. 1 are shown as constituting the upper and lower members of the frame, from which supporting arms, later described, extend, that said members are formed from somewhat foreshortened tubular members 1 and 3 supplemented by bushings 1' and 3' at each side, of equal outer and inner diameter to the tubular member 1 and 3 and rotatable with respect thereto, through which are passed the extensions 5' of the curved parts 5.

The actual rebound surface of the device includes substantially an inextensible central area provided with a net 7 of nylon or the like, and a peripheral connecting portion in the form of loops of suitable elastic rope 8 passed or coiled around the members and provided with hook members 9 engaged with the outer meshes of the net 7 to mount the net in taut condition across the frame, thereby simultaneously firmly retaining the members in their assembled condition.

The supporting means of the rebound device include a pair of upper arms 10 welded to and extending normally from the rotatable bushing 1', so that each arm 10 is separately rotatable about the central axis of the member 1 to vary its angular setting with respect to the plane of the frame and net 7. Each arm 10 is movably surrounded by a sleeve piece 11 having welded to its rear end a projection 12 projecting at right angle from it. A link 13 welded to the front part of sleeve piece 11 serves to attach a chain 14 having its free end firmly secured to a side of the related member 2 or 4, near its lower end. The sleeve pieces 11 are prevented from sliding off the arms 10 by pins 15 engageable into holes formed through the arms 10 near the outer ends thereof.

The supporting means further include a pair of lower arms 16 which have their one end secured to the bushings 3' of the lower side of the frame. The arms 16 are of telescopic construction and their effective length is adjustable by selective insertion of pins 17 into spaced holes bored through the said arms.

To suspend the rebound device thus described from a wall-bar apparatus including spaced horizontal wall-bars, the upper arms 10 are rotated out of the plane of the frame and then maintained in that position by the compression of the stop pieces 5 and the ends of the side 1 on the bushings 1' thereby resulting in the tension of the rebound surface. The upper arms 10 are then placed over a selected wall-bar 18 at the desired elevation, in such a way that the depending projection 12 engages behind the bar 18. The weight of the device acting by way of chains 14 pulls the sleeve pieces 11 in a forward direction towards the frame, thereby locking the projection 12 against the rear surface of the bar 18. The lower arms 16 are extended to a selected length, as earlier described, by suitably positioning the locking pins 17 to impart a desired inclination angle to the plane of the frame and the free ends of the arms 16 are placed more or less horizontally between two wall-bars 19 and 20, abutting against the vertical wall surface behind the wall-bar due to the weight of the device.

The frame is then pushed rearwards by applying manual pressure to the net 7, whereupon the upper arms 10 are caused to slide through the sleeve pieces 11 towards the wall until the outer end of each of the arms 10 is firmly abutted against the wall surface.

In this condition the rebound frame is firmly and stably supported against the vertical wall, with the supporting arms being independently abutted in tight engagement against the vertical supporting surface. The frame of the invention is a frame capable of warping, each of its members acting as a perpendicular axis of rotation among its adjacent members, due to the rotatable engagement of the straight extensions 5' of the curved parts 5 into the ends of the tubular members. Thus, when the frame is assembled, the opposite members can turn perpendicularly around median lines A'–A and B'–B, FIG. 2, of the frame at a certain angle, at the same time and in opposite directions. The amplitude of the movement is limited by the resistance to flexion of the components of the frame. Thus, in order to prevent excessive warping during handling operations, the extensions 5' of the curved parts 5 are preferably shaped to define an opening angle slightly greater than the angle which the adjacent frame members make normally when they are assembled. This assembly can be carried out by forced means owing to the elasticity of the metallic frame components.

It may be noted that each of the members may be rigidly and fixedly connected as by welding or the like at one of its two ends to one of the adjacent corner parts without the frame thereby losing its articulated structure and its warping capacity. Such a warping can be obtained even though the corner part and a member or two members form a single integral member while swivelable connections are kept at the ends of that single integral member.

The lengths of the upper arms 10 and components of the telescopic lower arms 16 are determined firstly, by the elasticity of the elastic surface 7, 8 in order that this surface be sufficiently distant from the wall-bars to avoid that the ball strikes, the wall-bars 18, 19 etc. or the wall when the elastic surface is deformed by a ball thrown into it; secondly, by the height of the frame in order that the variations of length of the telescopic arms 16 permit any desired inclination angle.

For instance, in medicine-ball practice, good results are obtained by using a frame of about 3 feet by 3 feet with upper arms of about one foot and lower telescopic arms adjusted to be locked at lengths varying from 1 to 2 feet.

Of course, for light balls thrown from a rather long distance or for rebound devices adapted for somersaults as explained below, the frame must be sustantially enlarged.

In use, for bouncing a ball off the device, the device is preferably mounted so that the center of the net is substantially at the same elevation as the departure point of the ball and that the plane of the frame is approximately normal to the trajectory of the ball. The device will then return the ball thrown at it, as would a partner, in the same general direction as that from which it was thrown and with almost the same force.

Figure 4:
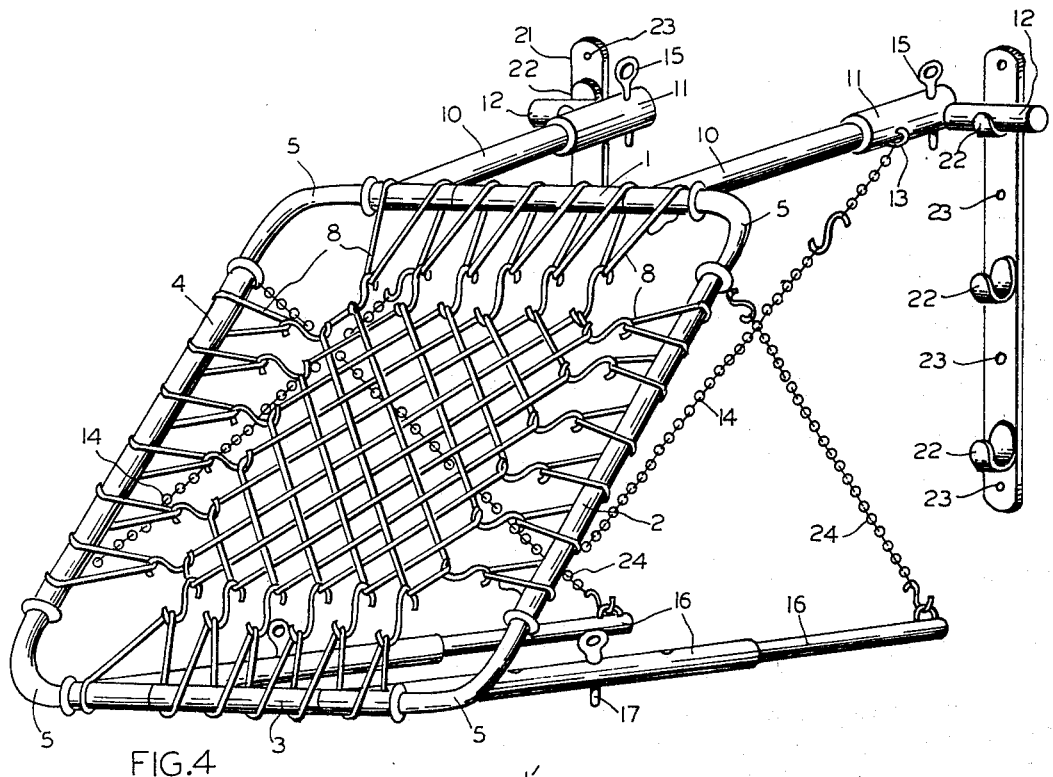
FIG. 4 is a perspective view of a similar device suspended from a vertical wall by suspension bracket members.

In FIG. 4 a rebound device generally similar to that described above is shown supported from a vertical wall by way of a pair of hanger members each in the form of a vertical flat bar 21 anchored to the wall through any suitable means 23 and provided with vertically spaced hooks 22. In this method of mounting, the sleeve pieces 11 are rotated about the upper arms 10 until the projecting pins 12 thereof are aligned horizontally outwards, in which setting the sleeve pieces 11 are locked by pins 15 engaging holes bored at suitable positions in the arms.

In addition, removable chains 24 have their one ends attached to the free ends of the telescopic lower arms 16 and their opposite ends respectively to the members 2 and 4 near their upper ends. When the projections 12 are engaged on selected hooks 22 as shown in FIG. 4 the free ends of the telescopic arms 16 perfectly abut against the wall, independently of one another because the member 3 aligns itself with respect to the vertical wall surface, by reason of the particularities earlier explained of the articulated assembly of the frame. In the present case the effect is due to the weight of the device and eventually to the first drawing back produced a the first reception of the ball.

Figure 5:
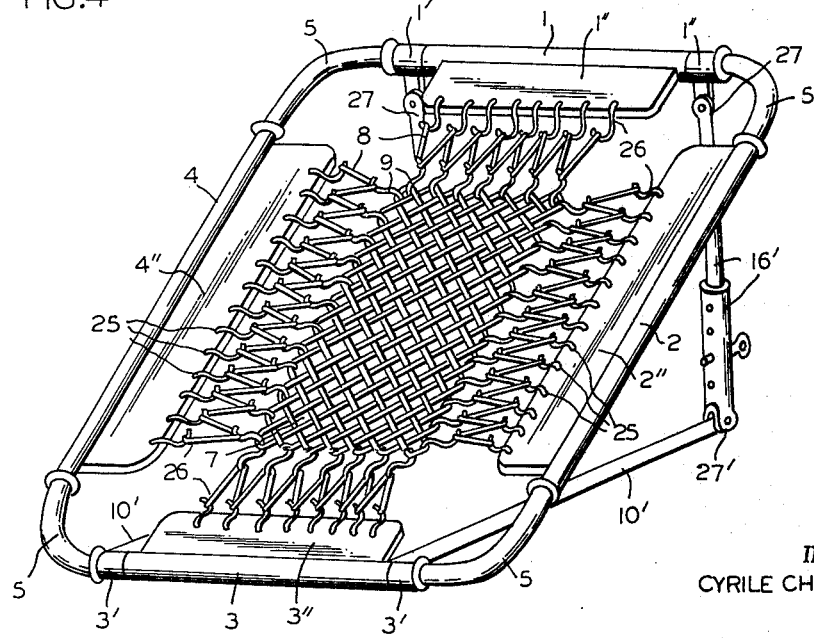
FIG. 5 is a perspective view of another form of a rebound device, supported on the ground.

In the further embodiment shown in FIG. 5 the rebound device is shown supported in inclined position from a horizontal ground surface. In this case telescopic arms 16' are pivoted at their inner ends to the upper bushings 1' by way of swivels 27 while at their outer ends they are pivoted through further swivels 27' to the outer ends of lower arms 10' extending from the lower bushings 3'. Adjustment of telescopic arms 16' permits of adjusting the angular inclination of the rebound surface, the warping and the swivels cooperating in ensuring the perfect abutment of the upper arm 1.

Also shown in FIG. 5 is the optional provision of reinforcing panels 1", 2", 3" and 4" having their outer sides welded along the inner parts of members 1, 2, 3 and 4. A line of holes 25 formed along the inner sides of said panels are engaged by hooks 26 provided on the elastic ropes 8 which stretch the central net 7 by its other hooks 9. As the rebound surface provided by the central net 7 and the loops of elastic rope 8 yields and rebounds under the impact of a ball, the panels 1", 2", 3", 4" rotate about the axes of frame members 1, 2, 3, and 4, said panels at all times remaining directed in the plane of the tension of the rebound surface and thus, at all times, opposing maximum resistance to this tension.

Figure 6:
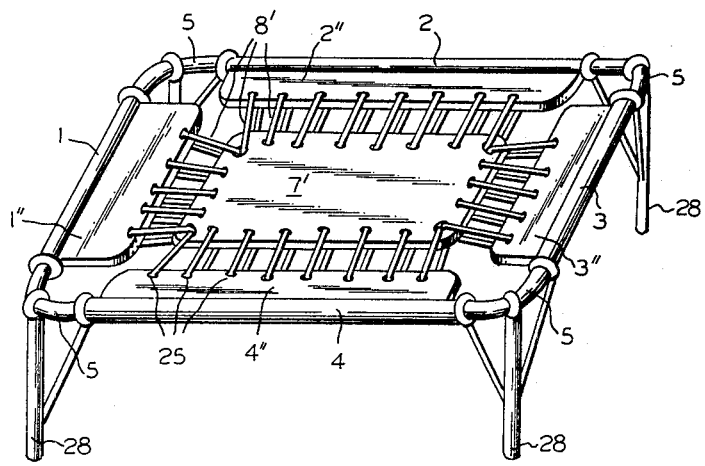
FIG. 6 is a perspective view of another form of the improved rebound device especially adapted for acrobatic somersaults and supported in position for such use.

In FIG. 6 the rebound device is shown positioned in a horizontal plane above the ground for use as an elastic jumpboard for somersaults and similar acrobatic exercises. In this case the central inextensible part of the rebound surface is preferably provided in the form of a strong fabric element 7' rather than a net connected by elastic ropes 8' to reinforcing panels 1", 2", 3" and 4" similar to those shown in FIG. 5. Four legs 28 are provided, secured to the curved parts 5, being preferably collapsible and suitably braced. However, the legs 28 may be constructed similarly to the arms 10 and 16 of the embodiment shown in FIG. 4, with the chains 14 and 24 then limiting the outward displacement of said arms. The telescopic arms 16 would then be adjusted to a convenient length and the arms 10 and 16 would be retained in a nearly vertical and slightly spread position, by the chains 14 and 24.

Figure 7:
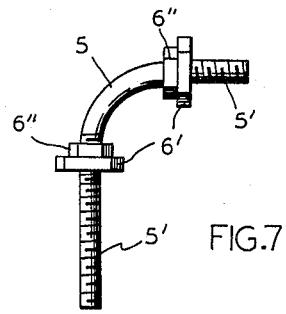
FIG. 7 is generally similar to FIG. 3 but illustrates a modified corner part.

In the further embodiment shown in FIG. 7 the extensions 5' of the corner parts 5 are formed with screwed studs and the annular abutments 6 are in the form of nuts 6' and lock-nuts 6". This embodiment enables the dimensions of the frame to be varied to a limited extent to adjust the tensioning of the rebound surface.

The invention can be carried out according to other variants. Thus the frame needs not necessarily be right angled as shown, but may be e.g. trapezoidal, the frame members being suitably dimensioned and the corner parts 5 being formed to suitable angles, the curved parts 5 may assume different forms and some of them may even be formed as parts of some of the members which they assemble, provided the pivotal interfitting relation between the face members of the frame is maintained according to the basic feature of the invention; the device can be mounted on any supporting means other than a wall or suspended at any bar fixed or removable, the slidable sleeve pieces 11 may be omitted, and the projections 12 may then be directly secured to the outer ends of the upper arms 10 as for suspending the device from the hooks 22 of the hanger devices shown in FIG. 4; the hanger members 21 may be supported forwardly from the vertical wall surface e.g. from horizontal cross pieces welded to their respective ends and adapted to be anchored to the wall at their free rear ends; the upper arms 10 would then be omitted and upper members 1 of the frame directly engaged on selected hooks of said hanger members, the central part of the rebound surface may also be elastic, the reinforcing panels 1", 2", 3", and 4" may be in the form of braced structures, without that these variants depart from the spirit of the present invention.

In FIGURES 8 to 11 inclusive there are shown some elements which may be utilized for rapidly and efficiently forming various types of frames such as shown in FIGURES 12 to 22 inclusive while permitting warping of the frames without any loss of firmness and rigidity.

Figure 8:
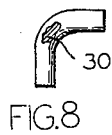
FIG. 8 is a plan view of a corner connecting element showing a modification of the forms shown in FIGURES 3 and 7.

In FIGURE 8 the element 30 has substantially right angular legs provided in a corner member which is solid.

Figure 9:
FIG. 9 is a plan view of a tubular member with a portion broken away constituting what may be termed an axle.

FIGURE 9 shows a side member or axle member 31 which is tubular.

Figure 10:
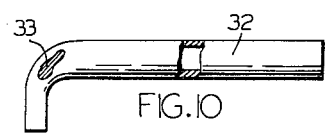
FIG. 10 is a similar plan view of a connecting element embodying a corner member and a tubular portion of a side.

In FIGURE 10 the element 32, 33 is a combination of the elements shown in FIGURES 8 and 9 and comprises a tubular portion 32 to which is attached the corner portion which is solid, 33.

Figure 11:
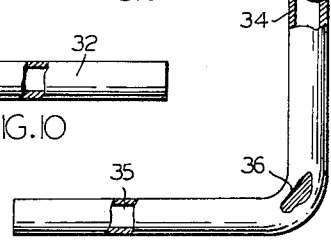
FIG. 11 is a similar view of an element with parts broken away showing a tubular element at each leg while the center connecting portion may be solid.

FIGURE 11 shows a construction wherein a tubular portion 34 constitutes one of the sides and a tubular portion 35 forming the adjacent side. The elements 34 and 35 are integrally connected by the solid portion forming a corner member 36.

Figure 12:
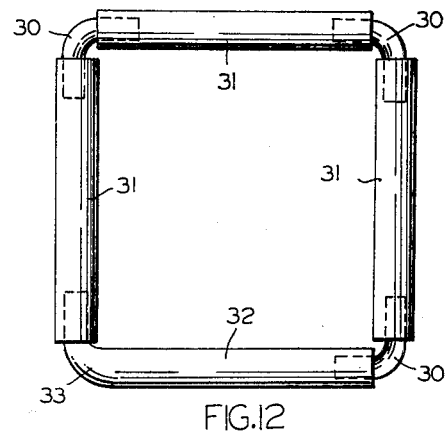

In FIGURE 12 the frame as shown is formed by three tubular members 31 interconnected by the corner members 30 and an element such as the element 32, 33 shown in FIGURE 10.

Figure 13:
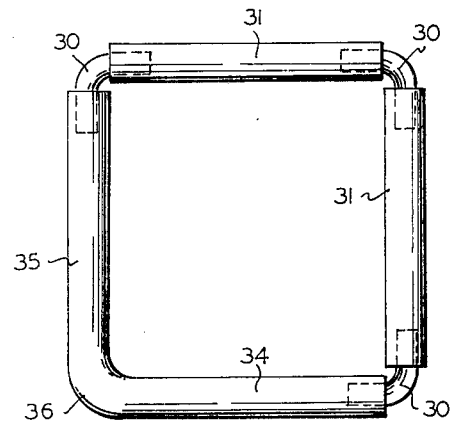

In FIGURE 13 the frame is formed by using three corner members 30 and two side members 31 while the third and fourth sides are formed by the element 34, 35, 36 of FIGURE 11.

Figure 14:
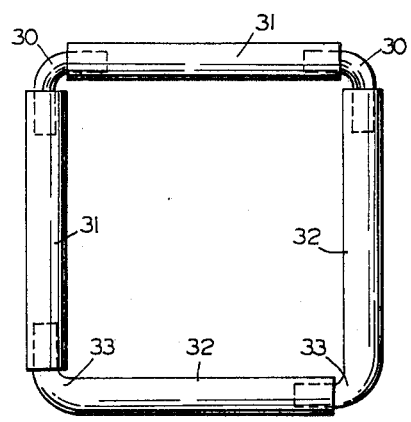

In FIGURE 14 the frame is formed by using two corner elements 30, two side members 31 and two members 32, 33.

Figure 15:
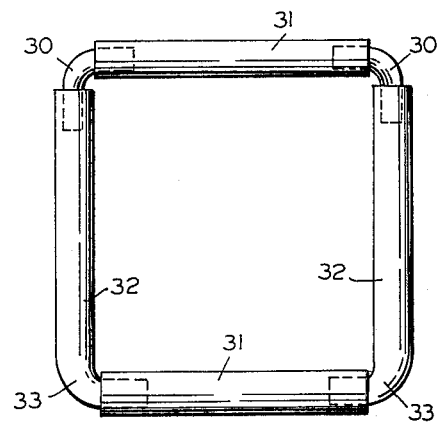

FIGURE 15 forms a frame by using the two corner members 30, two side members 31 and two elements 32, 33.

Figure 16:
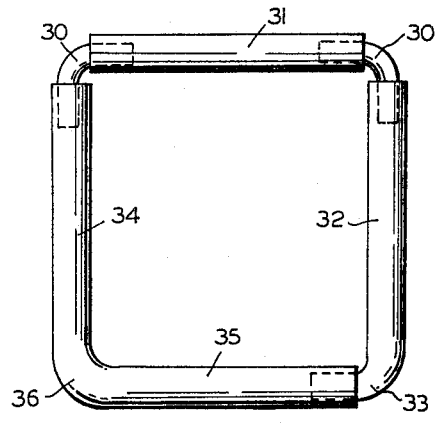

In FIGURE 16 the frame is formed by two corner members 30, one side member 31, one element 34, 36, 35 of FIGURE 11 and one element 32, 33 of FIGURE 10.

Figure 17:
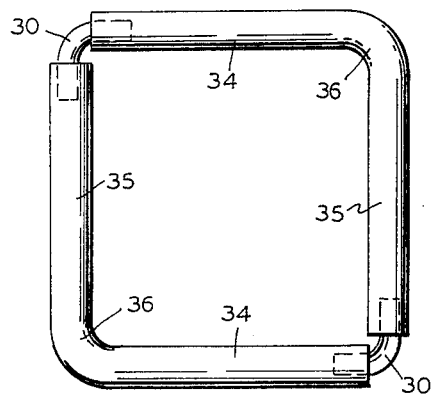

In FIGURE 17 a frame is shown wherein two corner elements 30 are used and two of the elements shown in FIGURE 11.

Figure 18:
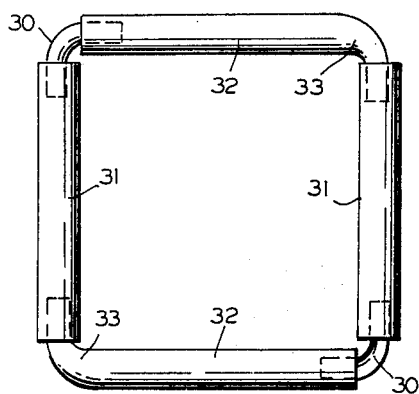

FIGURE 18 discloses a frame assembled from two corner elements 30, two of the elements shown in FIGURE 10 and two of the elements shown in FIGURE 9.

Figure 19:
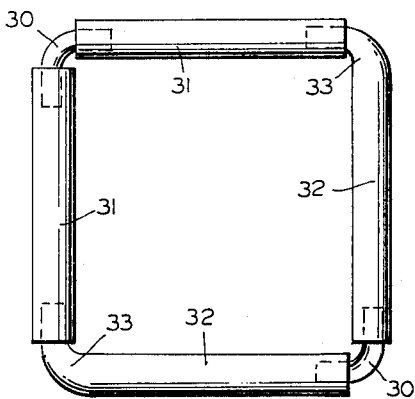

A further modification is shown in FIGURE 19 wherein two corner elements 30 are used together with two tubular elements 31 and two of the elements 32, 33.

Figure 20:
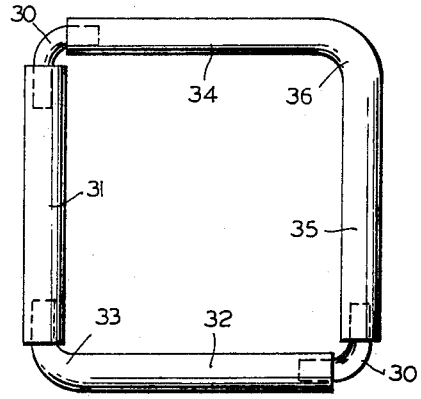

In FIGURE 20 two corner elements 30 are used, one side or axle member 31, one element 32, 33 and one element 34, 35, 36.

Figure 21:
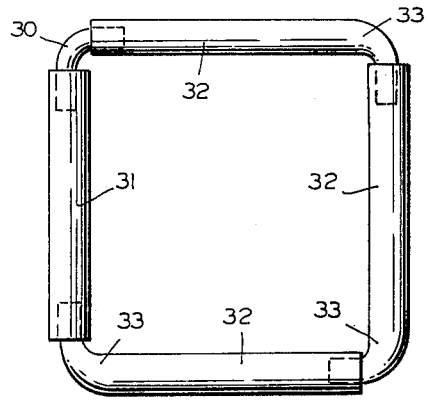

FIGURE 21 shows a further modification wherein only one corner member 30 is used, one side member 31 and three side members 32, 33.

Figure 22:
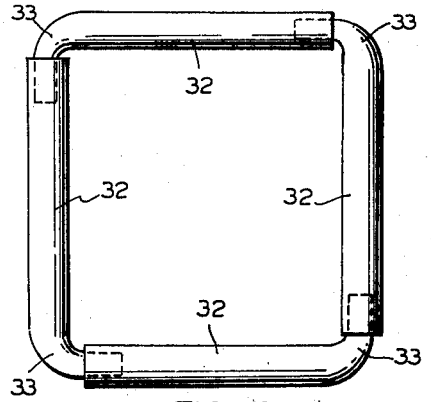

FIGURE 22 shows a further modification wherein four members such as shown in FIGURE 10 are used.

In FIGURE 23 a further modification is shown wherein one corner member 30 is used and one element 32, 33 such as shown in FIGURE 10. These two elements cooperate with the side members 37 wherein each of such side members 37 has provided at one end thereof a projecting element 38 which extends into the side member 31 located at the bottom of the frame. At the top of this frame there are provided secured to the corner member 30 and the corner of the element 32, some projections 39 which can be used as hand holds to bring about a slight warping of the frame whenever necessary or which can cooperate with a hanger device.

In FIGURE 24 there is shown a corner member 40 which normally before assembling into a frame has a slightly larger angle between the legs thereof. However, when such legs are positioned in the side members cooperating therewith the legs 40 will assume the dotted line positions shown in FIGURE 24 and therefore an elastic force is provided in the frame which tends to maintain the frame in planar condition.

In FIGURE 25 the frame containing the net 7a is provided with a support means which will allow any warping or swivelling to take place in the frame structure. On the frame coupling means such as 41 and 43 are provided and pivotally connected at 44 to the upper coupling means 41 are the telescoping legs 45, 46 which to universal joints their lower ends are pivotally connected at 47 to the cross-bar 48. The cross-bar 48 at its ends is interconnected swivelably with the arms 50 of the telescoping legs 49, 50 pivotally connected at the lower side of the frame to the couplings 43. Elements 45 and 46 and elements 49 and 50 are swivelably connected one with another.

So that the ground frame 43, 49, 50, 48, 50, 49, 43 has, at least, one swiveable connection in each of its sides and is able to be deformed by warping as well as the rebound frame and so that the legs 45, 46 can assume any position accommodating the twisting of the rebound frame and the base frame. The whole device can be deformed by warping as far as it may be useful for being automatically and perfectly adapted to the configuration of the ground upon which it is laid.

In FIGURE 26 a frame construction is shown wherein the corner members 52 have their legs disposed at a greater angle than a right angle and these corner members cooperate with the side tubular members 51 to form a hexagonal shaped frame. Each of the members 51 may be fixed as by welding and the like at one of its two ends to the end or leg of one of the corner members 52 which is adjacent to it without thereby impairing the ability of the frame to warp in a direction desired. As a rule, such rigidity between members 51 and corner members 52 would only be provided at one of the ends of the members 51.

In FIGURE 27 a further modification is shown wherein a frame similar to the frame shown in FIGURE 2 is provided using four linear members 51 and four corner members 53. In this construction, corner members 53 have also legs 54 extending at approximately right angle and swivelably interconnected with the side members, but the intermediate portions 53 are not arc shaped, as in FIGURE 2, but linear. Here also each of the linear members 51 may be fixedly connected, at one of its two ends to one of the corner members 54–53–54 which are adjacent to it.

As, in this form of the invention, the intermediate parts 53 of the corner members 54–53–54 are linear, this four sided articulated frame looks like an octagonal frame.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A rebound device comprising a frame having four independent side members, four arc shaped corner members having their legs extending approximately at right angles to one another, connecting respectively the adjacent ends of two adjacent side members of said frame in articulated relationship, each of said corner members serving as an axle allowing small swivelling movement of each of the side members, which is adjacent to it so as to obtain a unit deformable by warping by rotating simultaneously, and in contrary directions, the two pairs of opposite sides around an intermediate axis of said frame, elastic means stretched across said four sides of said frame and supporting means attached to said sides for engagement with a supporting surface.

2. A rebound device as claimed in claim 1 wherein said supporting means comprise a pair of spaced arms rotatably connected with one of said sides of said frame by bushings.

3. A rebound device as claimed in claim 1 wherein said supporting means comprise a pair of spaced arms rotatably connected with one of said sides of said frame, and chain like means joining the rear parts of said arms to opposite parts of said frame.

4. A rebound device as claimed in claim 1 wherein said supporting means comprise a pair of spaced arms rotatably connected with one of said sides of said frame, chain-like means joining the rear parts of said arms to opposite parts of said frame and a projection projecting horizontally and at right angles from the outer end of each of said arms.

5. A rebound device as claimed in claim 1 wherein said supporting means comprise a pair of spaced arms rotatably connected with one of said sides of said frame, a sleeve-piece sliding on each of said arms, a stop piece projecting from the rear end of said sleeve-piece and chain-like means joining the front end of said sleeve-piece to an opposite part of the frame.

6. A rebound device as claimed in claim 1 wherein said supporting means comprise a pair of spaced arms rotatably connected with one of said sides of said frame, a sleeve-piece sliding on each of said arms, a projection projecting at right angles from the rear end of said sleeve-piece, a chain joining the front end of said sleeve-piece to an opposite side of the frame and means for locking said sleeve-piece at the outer end of said arm and said projection in horizontal position.

7. A rebound device as claimed in claim 1 wherein said supporting means comprise a pair of spaced adjustable-length arms rotatably connected with one of said sides of said frame.

8. A rebound device as claimed in claim 1 wherein said supporting means comprise a pair of spaced arms rotatably connected to one of said sides of said frame and another pair of adjustable-length arms joining the outer ends of said spaced arms to the opposite side of said frame and swivel-like means located at the ends of said adjustable-length arms.

9. A rebound device as claimed in claim 1 wherein flat strengthening means are rigidly connected along the inner sides of said four sides cooperating with said elastic means.

10. A rebound device comprising a frame having a plurality of independent side members, corner members having their legs extending in a plane at an angle to one another, connecting respectively the adjacent ends of two adjacent side members of said frame in articulated relationship, each of said corner members serving as an axle allowing small swivelling movement of each of said side members adjacent to it to obtain a frame deformable by warping by rotating simultaneously, and in contrary directions, pairs of opposite side members around an intermediate axis of said frame and elastic means stretched across said side members of said frame.

11. A rebound device as set forth in claim 10 wherein supporting means are attached to said frame for engagement with a supporting surface.

12. A rebound device comprising a frame having a plurality of independent side members, means for connecting the adjacent ends of two adjacent side members of said frame in articulated relationship, said connecting means allowing small swivelling movement of each of said side members adjacent to it to obtain a frame deformable by warping by rotating simultaneously, and in contrary directions, pairs of opposite side members around an intermediate axis of said frame and elastic means stretched across said side members of said frame.

13. A rebound device as set forth in claim 12 wherein deformable supporting means are attached to said frame for engagement with a supporting surface.

14. A rebound device comprising a frame comprising two pairs of opposite and adjacent sides assembled approximately at right angles to one another, two pairs of opposite and adjacent corner members, four side members, each of said four corner members comprising two pivoting elements fixedly connected to one another approximately at a right angle, said four side members axially connecting the adjacent pivoting elements of two adjacent corner members in articulated relationship, each of said side members being swivelably interconnected at least at one of its two ends with one of the two corner-member pivoting-elements which is adjacent to it, each of said side members forming with two of said adjacent-corner-member-pivoting-elements one of said four sides of said frame so that said sides are of articulated construction so that each of said pair of opposite sides is swivelably interconnected by the other pair of opposite sides to obtain a frame deformable by warping by rotating simultaneously and in contrary directions the two pairs of opposite sides around the median lines of said frame and elastic means stretched across said frame.

15. A rebound device as claimed in claim 14 wherein said four side members comprise a side member which forms a single element with one of said corner members which is adjacent to it at one of its two ends by being integrally connected with said corner member pivoting element which is adjacent to it at said end, said single element being a lengthened corner member having a lengthened side formed by the integral connection of said side member with said pivoting element, said side member being swivelably interconnected at its other end with its adjacent member in said frame so that said single lengthened corner member remains swivelably interconnected in said frame.

16. A rebound device as claimed in claim 14 wherein said four side members comprise two side members which are both adjacent to one of said four corner members of said frame and which form a single element with said corner member by being integrally connected at their two ends which are adjacent to said corner member with the two corner member pivoting elements which are adjacent to said side members so that said single element is a lengthened corner member having two lengthened sides formed by the integral connections of said side members with said pivoting elements, said integrally connected side members being swivelably interconnected at their other ends with the members adjacent to them in said frame so that said single lengthened corner member remains swivelably interconnected in said frame with the members adjacent to it in said frame.

17. A rebound device as claimed in claim 14 wherein said four side members comprise a side member which is swivelably connected at its two ends with said two corner member pivoting elements which are adjacent to it in said frame so that said side member is capable of rotating independently about its own longitudinal axis.

18. A rebound device as claimed in claim 14 wherein said four side members comprise a foreshortened side-member constituting a short linear swivelable connecting means; said four corner members comprise two adjacent corner members of which one of said two pivoting elements is lengthened, the two said lengthened elements being adjacent, in said frame, to said short linear swivelable connecting means and being interconnected at their adjacent ends by said swivelable means so that said four linear sides of said frame comprise a side having a swivelable connection set in the central portion of said side.

19. A rebound device as set forth in claim 14 wherein said four corner members comprise a corner member shaped to define an angle greater than the angle that it is forced to define in said frame when said frame is assembled so that an elastic force is obtained in said frame provided by the inherent resiliency of the material of which it is made and tending to prevent excessive warping of said frame.

20. A rebound device as set forth in claim 14 wherein said four corner members comprise a corner member to which said two pivoting elements are fixedly connected at approximately right angles by an intermediate connecting portion engaged by said elastic means.

21. A rebound device as set forth in claim 14 wherein deformable support means are attached to said frame for engagement with a supporting surface.

22. A rebound device as set forth in claim 14 wherein supporting means are attached to said sides for engagement with a supporting surface.

23. A rebound device as set forth in claim 22 wherein said suporting means comprise a pair of spaced arms rotatably connected with one of said sides of said frame, chain-like means joining the rear parts of said arms to opposite parts of said frame and a projection projecting horizontally and at right angles from the outer end of each of said arms.

24. A rebound device as set forth in claim 22 wherein said supporting means comprise a pair of spaced arms rotatably connected with one of said sides of said frame, a sleeve-piece sliding on each of said arms, a stop piece projecting from the rear end of said sleeve-piece and chain-like means joining the front end of said sleeve-piece to an opposite part of the frame.

25. A rebound device as set forth in claim 22 wherein said supporting means comprise a pair of spaced arms rotatably connected with one of said sides of said frame, a sleeve-piece sliding on each of said arms, a projection projecting at right angles from the rear end of said sleeve-piece, a chain joining the front end of said sleeve-piece to an opposite side of the frame and means for locking said sleeve-piece at the outer end of said arm and said projection in horizontal position.

26. A rebound device as set forth in claim 22, wherein said supporting means comprise a pair of spaced adjustable-length arms rotatably connected with one of said sides of said frame.

27. A rebound device as set forth in claim 22 wherein sadi supporting means comprise a pair of spaced arms rotatably connected to one of said sides of said frame and another pair of adjustable-length arms joining the outer ends of said spaced arms to the opposite side of said frame and swivel-like means located at the ends of said adjustable-length arms.

28. A rebound device as set forth in claim 14 wherein flat strengthening means are rigidly connected along the inner sides of said side members, said members being swivelably connected at their two ends to said corner member pivoting elements which are adjacent to said ends, said elastic means being attached to and cooperating with said flat strengthening means.

29. A rebound device as claimed in claim 14 wherein said side members comprise a side member which is rigidly connected at one of its two ends to one of the adjacent corner members.

30. A rebound device as claimed in claim 14 wherein each of said side members comprise a member which is rigid with one of the two corner members which is adjacent to it to obtain a corner member, one pivoting element of which is lengthened by means of said last named member, said corner member being swivellingly included in said frame about the longitudinal axes of two adjacent sides of said frame and swivellingly connected to each of two corner members which are adjacent to it in said frame.

31. A rebound device as claimed in claim 14 wherein said side members comprise a member which is rigid with one of the two corner members which are adjacent to it to form a frame comprising a side having only one swivelling means about the longitudinal axis of said side.

References Cited

UNITED STATES PATENTS 2,590,049    3/1952    Sidlinger _____ 272—65
2,944,816    7/1960    Dixon.

FOREIGN PATENTS 1,316,614   12/1962   France.

ANTON O. OECHSLE, Primary Examiner

P. E. SHAPIRO, Assistant Examiner

U.S. Cl. X.R.

182—140; 272—65; 273—26; 287—54, 56